(12) United States Patent
Lin

(10) Patent No.: US 11,335,082 B2
(45) Date of Patent: May 17, 2022

(54) READING SYSTEM, MOVING BODY, READING METHOD, AND STORAGE MEDIUM

(71) Applicants: KABUSHIKI KAISHA TOSHIBA, Minato-ku (JP); TOSHIBA DIGITAL SOLUTIONS CORPORATION, Kawasaki (JP)

(72) Inventor: Chiayu Lin, Ota (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 21 days.

(21) Appl. No.: 16/877,651

(22) Filed: May 19, 2020

(65) Prior Publication Data
US 2020/0380287 A1 Dec. 3, 2020

(30) Foreign Application Priority Data
May 27, 2019 (JP) .............................. JP2019-098633

(51) Int. Cl.
  *G06V 10/44* (2022.01)
  *G06T 7/60* (2017.01)
  (Continued)

(52) U.S. Cl.
  CPC ............... *G06V 10/44* (2022.01); *G06T 7/11* (2017.01); *G06T 7/60* (2013.01); *G06V 10/267* (2022.01);
  (Continued)

(58) Field of Classification Search
  CPC .. G06K 9/4604; G06K 9/48; G06K 2009/484; G06K 9/342; G06K 9/344; G06K 9/00624; G06K 2209/03; G06T 7/60; G06T 7/73; G06T 7/13; G06T 7/11; G06V 10/44; G06V 10/267; G06V 10/46; G06V 30/153; G06V 10/471; G06V 20/00; G06V 2201/02
  (Continued)

(56) References Cited

U.S. PATENT DOCUMENTS

| 5,673,331 A * | 9/1997 | Lewis ...................... G06K 9/20 382/100 |
| 2001/0055425 A1* | 12/2001 | Chiu .................... G06K 9/4633 382/199 |
| 2012/0201423 A1 | 8/2012 | Onai et al. |

FOREIGN PATENT DOCUMENTS

| JP | 2846217 B2 * | 1/1999 |
| JP | 2005-341452 A | 12/2005 |

(Continued)

*Primary Examiner* — Nay A Maung
*Assistant Examiner* — Daniella M. DiGuglielmo
(74) *Attorney, Agent, or Firm* — Oblon, McClelland, Maier & Neustadt, L.L.P.

(57) ABSTRACT

According to an embodiment, a reading system includes a first extractor and a reader. The first extractor extracts, from an image in which a meter is imaged, a first region surrounded with a first contour, and a second region surrounded with a second contour positioned outward of the first contour. The reader calculates a first indication based on the first region, calculates a second indication based on the second region, calculates a first score relating to the first indication based on the first region, and calculates a second score relating to the second indication based on the second region.

20 Claims, 11 Drawing Sheets

(51) Int. Cl.
*G06T 7/11* (2017.01)
*G06V 10/46* (2022.01)
*G06V 10/26* (2022.01)
*G06V 30/148* (2022.01)
*G06T 7/73* (2017.01)
*G06T 7/13* (2017.01)
*G06V 20/00* (2022.01)

(52) U.S. Cl.
CPC ............ *G06V 10/46* (2022.01); *G06V 30/153* (2022.01); *G06T 7/13* (2017.01); *G06T 7/73* (2017.01); *G06V 10/471* (2022.01); *G06V 20/00* (2022.01); *G06V 2201/02* (2022.01)

(58) Field of Classification Search
USPC ........................................................ 382/109
See application file for complete search history.

(56) References Cited

FOREIGN PATENT DOCUMENTS

| | | | |
|---|---|---|---|
| JP | 2006-120133 A | | 5/2006 |
| JP | 2006120133 A | * | 5/2006 |
| JP | 3799408 B1 | | 7/2006 |
| JP | 2007-114828 A | | 5/2007 |
| JP | 4020377 B2 | | 12/2007 |
| JP | 2008-243103 A | | 10/2008 |
| JP | 2008243103 A | * | 10/2008 |
| JP | 2011-90374 A | | 5/2011 |
| JP | 5712801 B2 | | 5/2015 |
| JP | 2017-126187 A | | 7/2017 |
| JP | 2019-169116 A | | 10/2019 |

\* cited by examiner

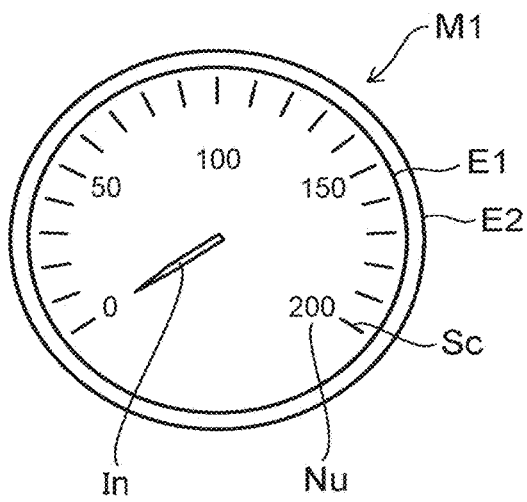
FIG. 2A
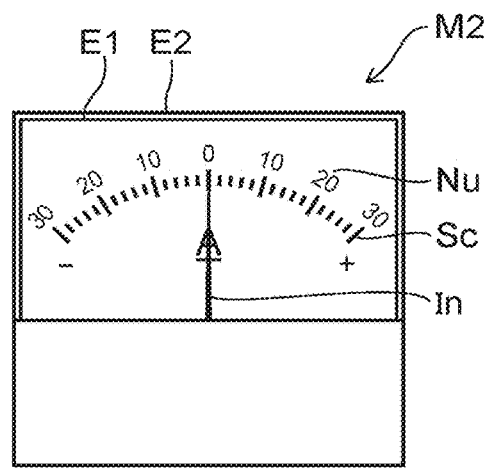
FIG. 2B
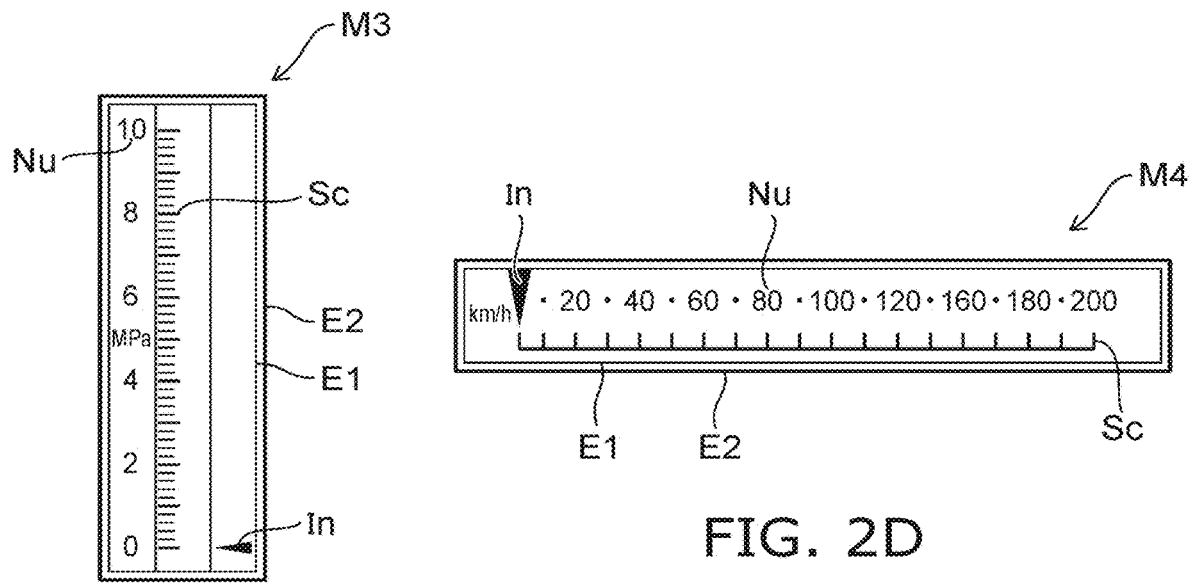
FIG. 2C
FIG. 2D

READING SYSTEM, MOVING BODY, READING METHOD, AND STORAGE MEDIUM

CROSS-REFERENCE TO RELATED APPLICATIONS

This application is based upon and claims the benefit of priority from Japanese Patent Application No. 2019-098633, filed on May 27, 2019; the entire contents of which are incorporated herein by reference.

FIELD

Embodiments described herein relate generally to a reading system, a moving body, a reading method, and a storage medium.

BACKGROUND

There is a system that reads a value (an indication) of a meter. It is desirable to increase the reliability of the indication read by the reading system.

BRIEF DESCRIPTION OF THE DRAWINGS

FIG. 2A to FIG. 2D are schematic views illustrating meters;

DETAILED DESCRIPTION

Figure 1:
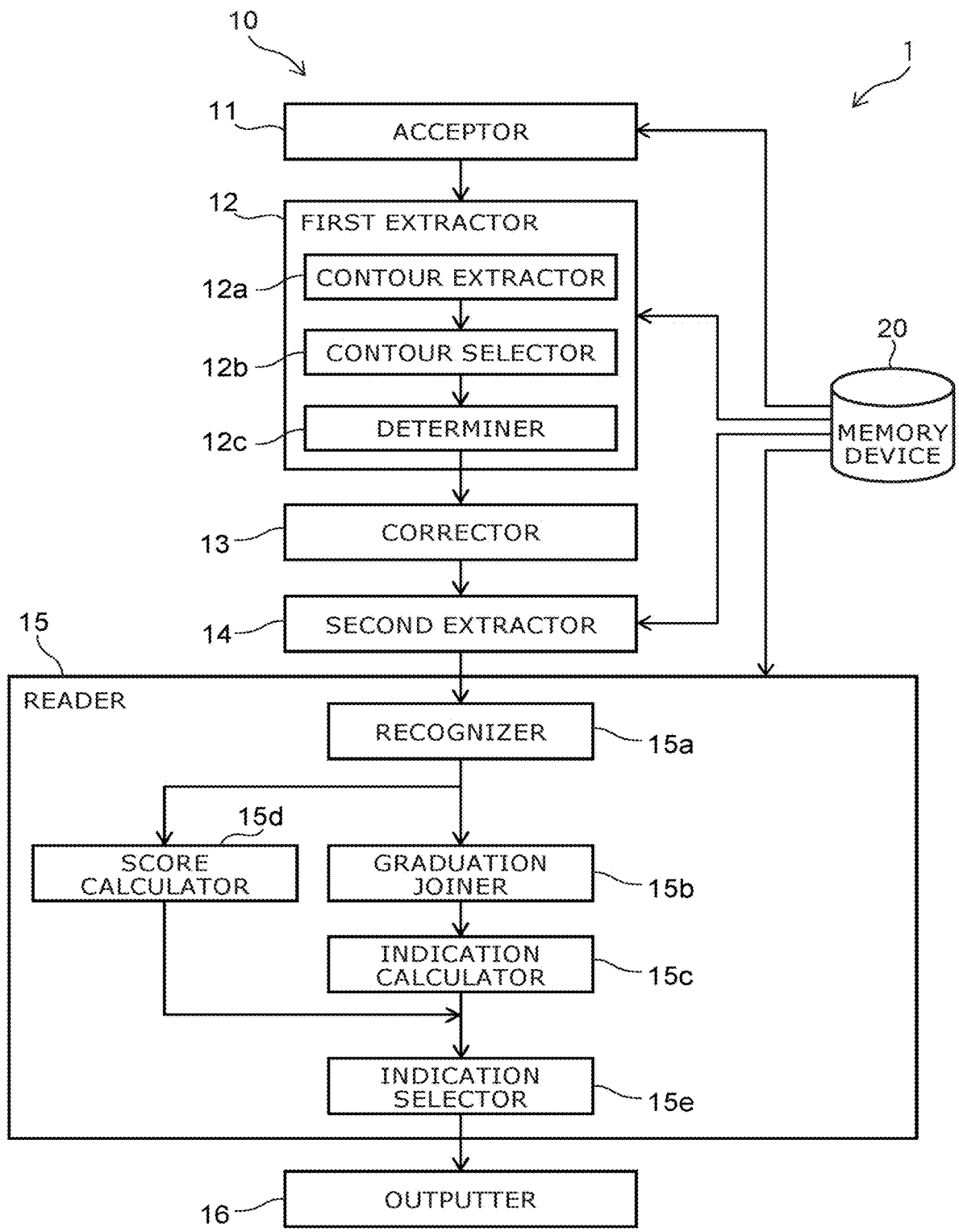
FIG. 1 is a block diagram illustrating a functional configuration of a reading system according to a first embodiment.

According to an embodiment, a reading system includes a first extractor and a reader. The first extractor extracts, from an image in which a meter is imaged, a first region surrounded with a first contour, and a second region surrounded with a second contour positioned outward of the first contour. The reader calculates a first indication based on the first region, calculates a second indication based on the second region, calculates a first score relating to the first indication based on the first region, and calculates a second score relating to the second indication based on the second region.

Various embodiments are described below with reference to the accompanying drawings.

In the specification and drawings, components similar to those described previously are marked with the same reference numerals, and a detailed description is omitted as appropriate.

First Embodiment

FIG. 1 is a block diagram illustrating a functional configuration of a reading system according to a first embodiment.

FIG. 2A to FIG. 2D are schematic views illustrating meters.

FIG. 3A, FIG. 3B, FIG. 4A to FIG. 4C, FIG. 5A, FIG. 5B, FIG. 6, and FIG. 7A to FIG. 7D are figures for describing processing according to the reading system according to the first embodiment.

The reading system 1 is used to read a value (an indication) of a meter from an image including the meter. The type of the object meter is arbitrary. For example, the reading system 1 may be used to read the indications of round meters M1 and M2 such as those illustrated in FIG. 2A and FIG. 2B. A round meter includes a pointer In rotating with some point as the center, multiple graduations Sc marked around the center point, numerals Nu marked to correspond to at least a portion of the multiple graduations Sc. The graduations Sc are arranged in a circular configuration or a circular arc-like configuration. The round meter shows a value by the pointer In indicating a designated graduation Sc by one of the pointer In or the graduations Sc rotating along the arrangement direction of the graduations Sc.

The reading system 1 also can be used to read the indication of a vertical meter M3 such as that illustrated in FIG. 2C or a horizontal meter M4 such as that illustrated in FIG. 2D. Vertical meters and horizontal meters include the pointer In, the multiple graduations Sc arranged in one direction, and the numerals Nu marked to correspond to at least a portion of the multiple graduations Sc. Vertical meters and horizontal meters show a value by the pointer In indicating a designated graduation Sc by one of the pointer In or the graduations Sc moving along the arrangement direction of the graduations Sc.

As illustrated in FIG. 1, the reading system 1 according to the first embodiment includes a processing device 10. The processing device 10 includes an acceptor 11, a first extractor 12, a corrector 13, a second extractor 14, a reader 15, and an outputter 16.

For example, an external imaging device acquires a static image by imaging the meter. The imaging device transmits the image in which the meter is imaged to the processing device 10. Or, the imaging device may store the image in a memory device 20. The processing device 10 may acquire the image by accessing the memory device 20. A video image may be imaged by the imaging device. For example, the imaging device cuts out a static image from the video image and transmits the static image to the processing device 10 or the memory device 20. An object other than the meter may be imaged in the image.

Figure 3A:
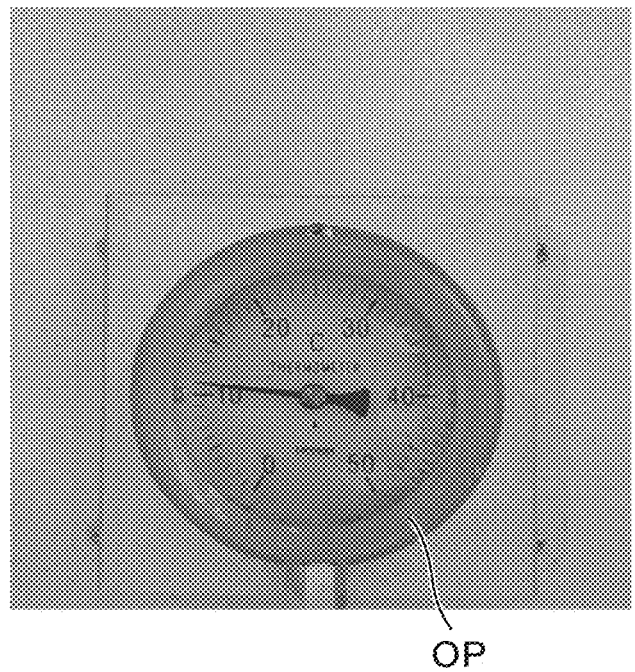
FIG. 3A and FIG. 3B, FIG. 4A to FIG. 4C, FIG. 5A and FIG. 5B, FIG. 6, and FIG. 7A to FIG. 7D are figures for describing processing according to the reading system according to the first embodiment.

The acceptor 11 accepts the image input to the processing device 10. The acceptor 11 outputs the image to the first extractor 12. FIG. 3A is an example of the image input to the processing device 10.

From the input image, the first extractor 12 extracts a region including the graduations, the numerals, and the pointer of the meter. As one specific example, the first extractor 12 includes a contour extractor 12a, a contour selector 12b, and a determiner 12c.

For example, the contour extractor 12a extracts contours (edges) included in the input image based on the brightness difference or the luminance difference of the input image. The contour extractor 12a also may perform processing of the input image as appropriate when extracting the contour. For example, the contour extractor 12a may convert the input image into grayscale, subsequently binarize the image, and extract the contours from the binary image.

Figure 3B:
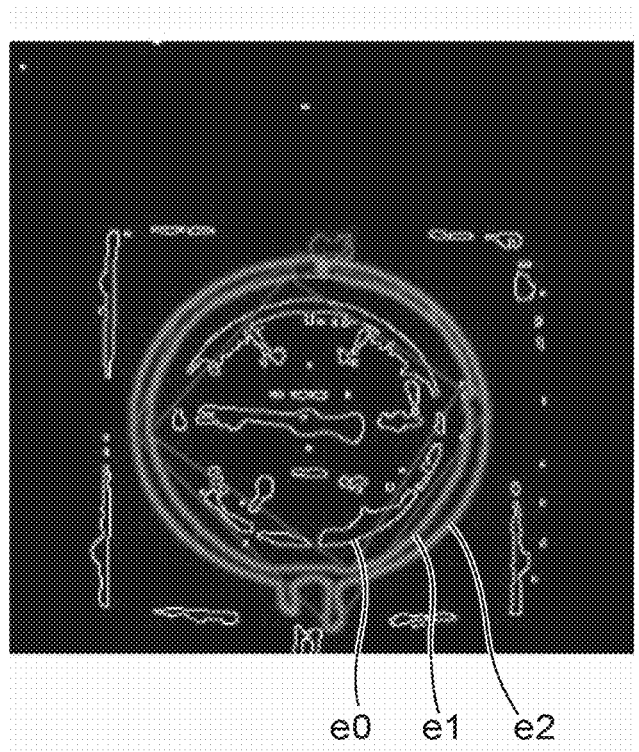

The contour selector 12b selects a portion of the contours from the multiple contours that are extracted. For example, the contour selector 12b compares the maximum length in some one direction and the surface area to preset thresholds for the regions surrounded with the contours. The contour selector 12b selects the regions for which the maximum length and the surface area respectively are greater than the thresholds. Thereby, the regions that have surface areas that are too small, regions having shapes much different from a meter, etc., are excluded. For example, multiple contours are extracted from the input image illustrated in FIG. 3A, and contours e1 and e2 illustrated in FIG. 3B are selected from the multiple contours.

The determiner 12c determines the contours of the meter to which the contours of the selected regions correspond. For example, an inner contour E1 that surrounds a display panel and a contour E2 outward of the contour E1 exist in each of the meters illustrated in FIG. 2A to FIG. 2D. From the selected contours, the determiner 12c determines a first contour corresponding to the contour E1 and a second contour corresponding to the contour E2.

Figure 4A:
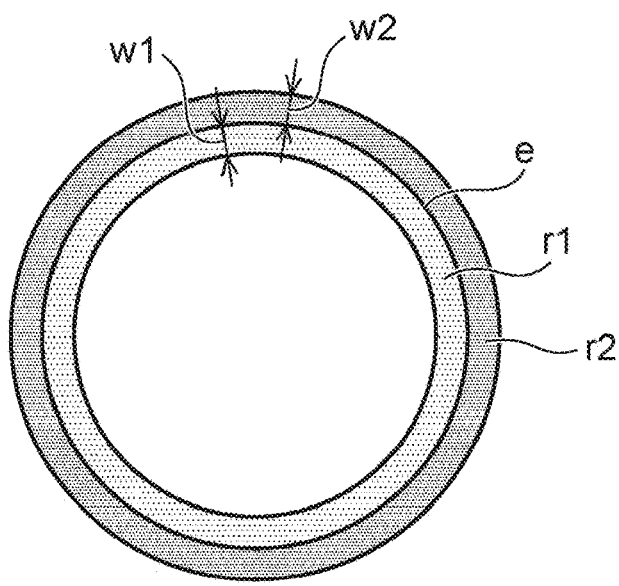

For example, as illustrated in FIG. 4A, the determiner 12c sets two regions r1 and r2 for each contour e that is selected. The region r1 is positioned inward of the contour e. The region r2 is positioned outward of the contour e. The shapes of the regions r1 and r2 can be modified appropriately according to the meter to be read. As an example, the region r1 and the region r2 are set along the contour e. Widths w1 and w2 of the regions are determined according to the size of the contour e. For example, the proportion of the width w1 to the size of the contour e and the proportion of the width w2 to the size of the contour e are prestored in the memory device 20.

The determiner 12c determines the relationship between the luminance of the region r1 and the luminance in the region r2 for each contour e. For example, the determiner 12c determines which of the average value of the luminance in the region r1 and the average value of the luminance in the region r2 is greater. When the surface areas of the region r1 and the region r2 are equal, the determiner 12c may determine which of the total value of the luminance in the region r1 and the total value of the luminance in the region r2 is greater.

A first relationship of the luminance of the region positioned inward of the contour E1 and the luminance of the region positioned outward of the contour E1 for the meter to be read is stored in the memory device 20. Also, a second relationship of the luminance of the region positioned inward of the contour E2 and the luminance of the region positioned outward of the contour E2 is stored in the memory device 20. The determiner 12c compares the relationship of the luminances of each contour e to the relationships of the luminances stored in the memory device 20. The determiner 12c determines the contour e having a relationship of the luminances matching the first relationship to be the first contour. The determiner 12c determines another contour e having a relationship of the luminances matching the second relationship to be the second contour.

Figure 4B:
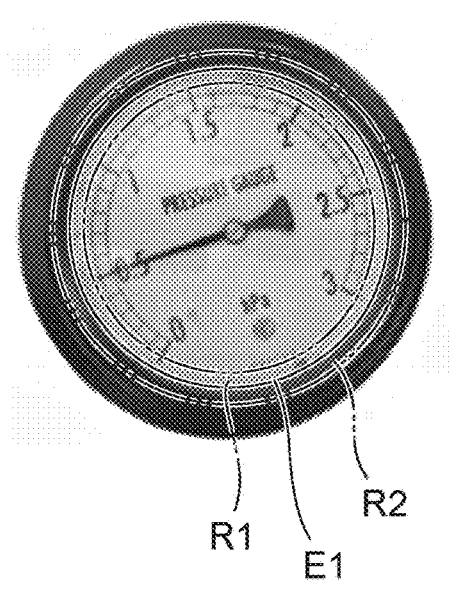
Figure 4C:
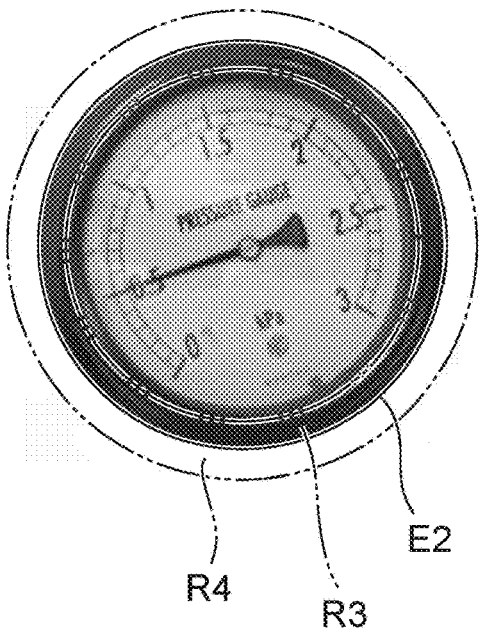

Typically, the background of the display panel of a meter is a bright color (e.g., white). The outer rim of the meter is a darker color than the display panel. A wall or the like to which the meter is mounted has a brighter color than the outer rim of the meter. In such a case, the first relationship is set so that the luminance of a region R1 positioned inward of the contour E1 is greater than the luminance of a region R2 positioned outward of the contour E1 as illustrated in FIG. 4B. The second relationship is set so that the luminance of a region R3 positioned inward of the contour E2 is less than the luminance of a region R4 positioned outward of the contour E2 as illustrated in FIG. 4C.

The contours E1 and E2 may be contours other than the contour of the display panel and the contour of the meter. For example, a contour other than the display panel and the meter may be extracted as a result of the image processing due to a difference of the color, the shape, or the reflectance between the portions of the meter. The contour that is extracted may be used as a contour corresponding to the meter. In such a case, the relationship between the luminance of the region positioned inward of the contour and the luminance of the region positioned outward of the contour is stored in the memory device 20.

For example, the contour E1 of the display panel and the contour E2 of the meter exist in the meter illustrated in FIG. 3A. On the other hand, as a result of the contour extraction by the image processing, the contour e1 is extracted between a contour e0 corresponding to the contour E1 and the contour e2 corresponding to the contour E2 as illustrated in FIG. 3B. The contour e1 is extracted due to the shape of the outer rim of the meter. An outer rim OP of the meter illustrated in FIG. 3A is rounded, and the reflection amounts of the light inward of the outer rim and outward of the outer rim are different. As a result, the contour e1 is extracted at substantially the center of the outer rim OP. The following processing may be performed by using the contour e1 as the first contour corresponding to the meter.

The determiner 12c extracts, from the input image, a first region that is surrounded with the first contour satisfying the first relationship, and a second region that is surrounded with the second contour satisfying the second relationship. As an example, the first region includes the display panel of the meter. The second region includes the display panel and the outer rim of the meter.

The corrector 13 performs projective transformations of the first region and the second region as appropriate. Typically, the contour of the meter or the contour of the display panel of the meter is circular or quadrilateral. When the first contour or the second contour is trapezoidal, parallelogram-shaped, etc., the corrector 13 performs projective transformation of the first region or the second region so that the first contour or the second contour is rectangular. When the first contour or the second contour is elliptical or oval, the corrector 13 performs projective transformation of the first region or the second region so that the first contour or the second contour is circular. Distortion of the first region or the second region is corrected by the projective transformation. The corrector 13 outputs the corrected first region and the corrected second region to the second extractor 14.

The second extractor 14 extracts a first scale region and a first numeral region from the first region. Also, the second extractor 14 extracts a second scale region and a second numeral region from the second region. For example, the positions and the sizes of the first scale region and the first numeral region are determined based on the first region. The positions and the sizes of the second scale region and the second numeral region are determined based on the second region. The relationship between the first scale region and the first numeral region for the first region and the relationship between the second scale region and the second numeral region for the second region are prestored in the memory device 20. The second extractor 14 outputs the first scale region, the first numeral region, the second scale region, and the second numeral region to the reader 15.

The reader 15 calculates a first indication based on the first region and calculates a second indication based on the second region. Also, the reader 15 calculates a first score relating to the first indication based on the first region, and calculates a second score relating to the second indication based on the second region.

Specifically, the reader 15 includes a recognizer 15a, a graduation joiner 15b, an indication calculator 15c, a score calculator 15d, and an indication selector 15e.

The recognizer 15a recognizes multiple graduations marked in the display panel from the luminance difference in the scale region. The recognizer 15a recognizes multiple numerals marked in the display panel in the numeral region. For example, the recognizer 15a designates the numerals by cutting out the numerals from the display panel one at a time and comparing the cut-out numeral and preregistered numerals. The recognizer 15a recognizes the position and the angle of the pointer from the luminance distribution in the numeral region. The recognizer 15a may recognize the position and the angle of the pointer from the luminance distributions in the numeral region and the scale region. The recognizer 15a also may recognize the shape of the pointer.

When the meter to be read is round, the recognizer 15a may perform polar transformations of the scale region and the numeral region. For example, the recognizer 15a recognizes the graduations and the pointer from the scale region and the numeral region having undergone the polar transformations, and recognizes the numerals from the numeral region that has not undergone a polar transformation.

Figure 5A:
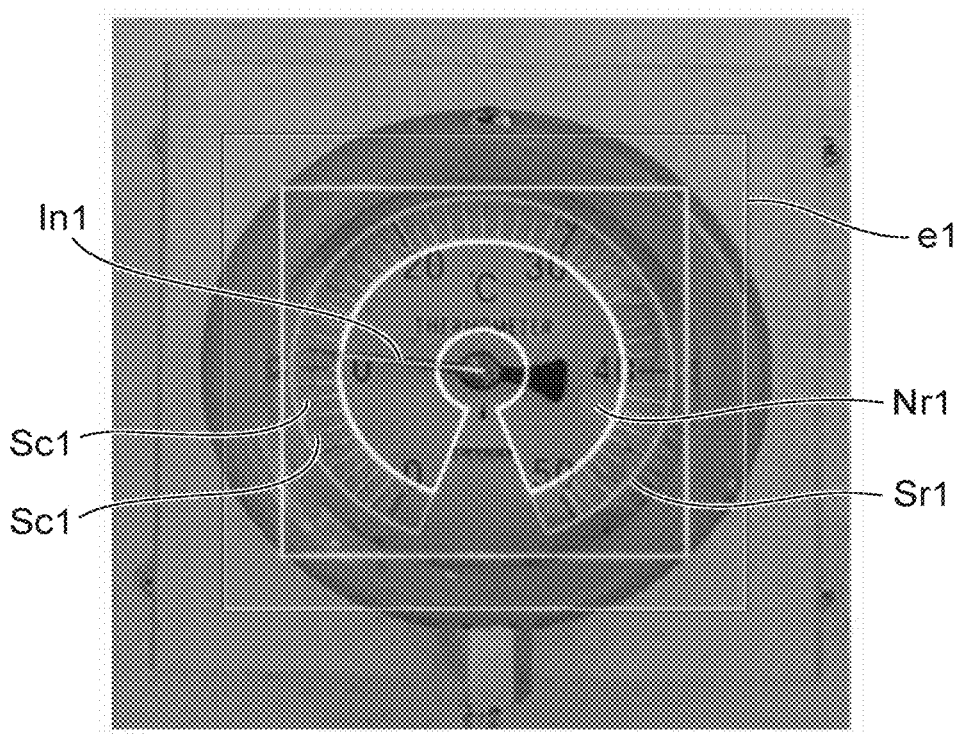

FIG. 5A illustrates a first scale region Sr1 and a first numeral region Nr1 set based on the first contour e1. For example, as illustrated in FIG. 5A, multiple graduations Sc1 (a first graduation group) and a pointer In1 (a first pointer) are recognized based on the first scale region Sr1 and the first numeral region Nr1. Also, multiple numerals (a first numeral group) are recognized based on the first numeral region Nr1.

Figure 5B:
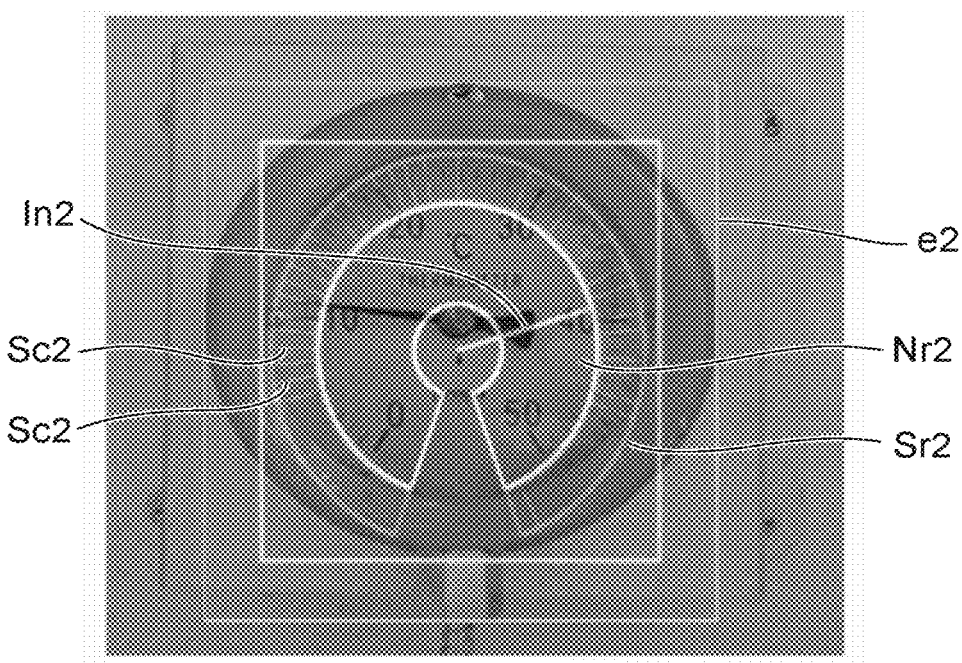

FIG. 5B illustrates a second scale region Sr2 and a second numeral region Nr2 set based on the second contour e2. For example, as illustrated in FIG. 5B, multiple graduations Sc2 (a second graduation group) and a pointer In2 (a second pointer) are recognized based on the second scale region Sr2 and the second numeral region Nr2. Also, multiple numerals (a second numeral group) are recognized based on the second numeral region Nr2.

In the example, the positions and the sizes of the scale regions and the numeral regions are set based on the extracted contours. Therefore, as illustrated in FIG. 5B, there are cases where the scale region and the numeral region that are set based on one contour are shifted from the region where the graduations and the numerals actually are marked. As a result, as illustrated in FIG. 5B, there are cases where the position or the angle of the pointer that is recognized is different from the position or the angle of the actual pointer. However, even in such a case as described below, a more accurate indication can be read based on the scale region and the numeral region set based on another contour.

The recognizer 15a outputs, to the graduation joiner 15b, the graduation groups, the numeral groups, and the pointers recognized based on the first region and the second region.

Figure 6:
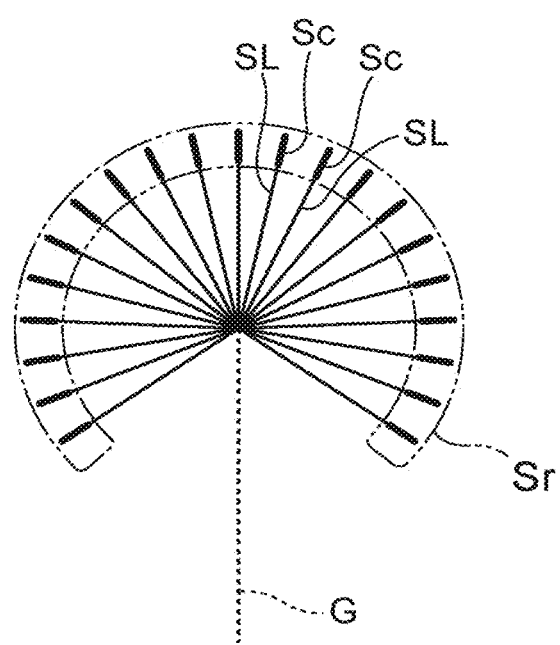

As illustrated in FIG. 6, the graduation joiner 15b stores, as the position information of the graduations, the angles between a reference line G and straight lines SL along which the graduations Sc extend. The graduation joiner 15b determines the graduations Sc corresponding to the recognized numerals.

The indication calculator 15c calculates the indication of the meter based on the angles of the graduations, the correspondence information of the graduations and the numerals, and the angle of the pointer for each of the first region and the second region. The first indication based on the first region and the second indication based on the second region are calculated thereby.

The score calculator 15d calculates the first score relating to the first indication and the second score relating to the second indication. The first score and the second score respectively show the sureness of the first indication and the sureness of the second indication. For example, the score calculator 15d calculates the first score by using the first graduation group, the first numeral group, or the first pointer. The score calculator 15d calculates the second score by using the second graduation group, the second numeral group, or the second pointer.

In the example described below, the score is calculated to be higher as the goodness of the image increases and the indication has a higher likelihood of being read correctly. A higher score indicates that the reliability of the indication that is read is high. For example, a good image refers to a state in which the contours are clear because the resolution of the image is sufficiently high, the adhered matter on the meter is low, reflections of light by the meter are low, etc. The score is not limited to the example; the score may be calculated to be lower as the goodness of the character image increases. In such a case, a lower score indicates that the reliability of the indication that is read is high.

A method for calculating the score by using the graduation group is as follows.

Figure 7A:
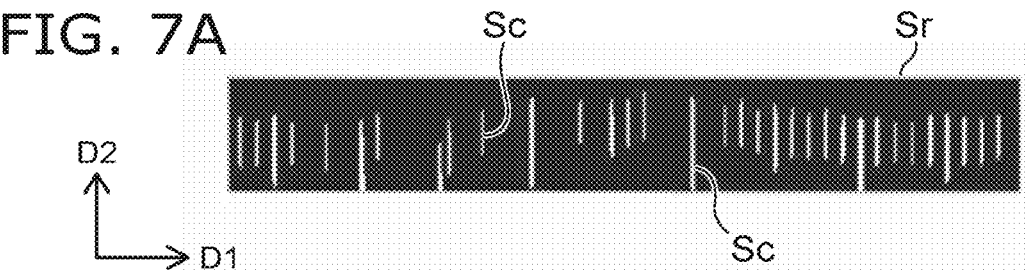

FIG. 7A illustrates a scale region Sr and the recognized graduations Sc. In the example, the multiple graduations Sc are arranged in a first direction D1, and the graduations Sc extend along a second direction D2. The image illustrated in FIG. 7A may be an image obtained by a polar transformation. In such a case, the first direction D1 corresponds to the circumferential direction, and the second direction D2 corresponds to the diametrical direction.

The score calculator 15d calculates the fluctuation of the spacing between the graduations Sc or the fluctuation of the lengths in the second direction D2 of the graduations Sc. The score calculator 15d calculates the score to be higher as the fluctuation decreases.

The number of graduations marked on the actual meter may be prestored in the memory device 20. The score calculator 15d may compare the number of the graduations Sc recognized in the scale region Sr to the number of graduations stored in the memory device 20. The score calculator 15d calculates the score to be higher as the difference between the number of the recognized graduations Sc and the number of stored graduations decreases.

Figure 7B:
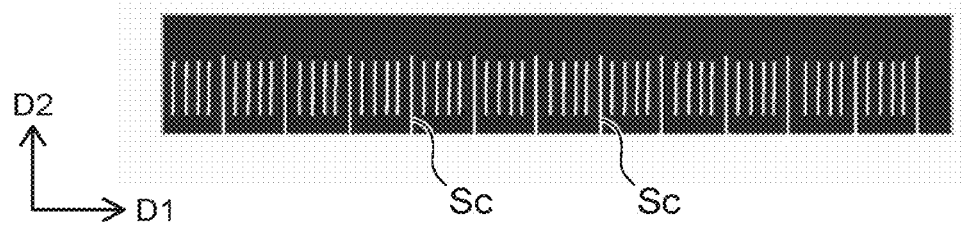

An image that corresponds to the graduations of the actual meter may be prestored in the memory device 20. FIG. 7B is an example of an image stored in the memory device 20. The score calculator 15d performs pattern matching between the image and the recognition result of the graduations. The score calculator 15d calculates the score to be higher as the matching rate increases.

The score calculator 15d may calculate the score by combining two or more of these methods for calculating the score based on the graduation group.

A method for calculating the score by using the numeral group is as follows.

The score calculator 15d refers to the match rate when the numerals are recognized by the recognizer 15a. The score calculator 15d calculates the score based on the match rate. For example, the score calculator 15d averages the match rates of the multiple numerals marked in the display panel and uses the average value as the score.

A method for calculating the score by using the pointer is as follows.

Figure 7C:
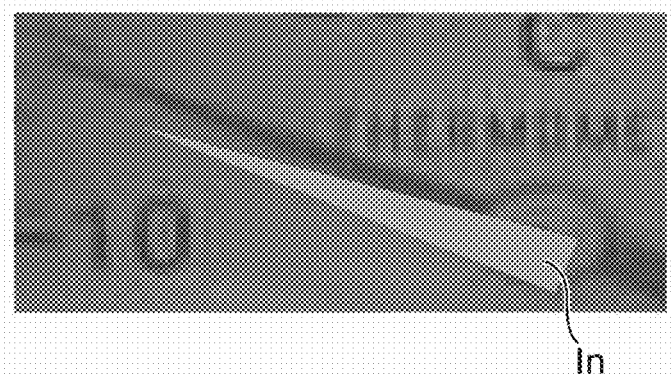

An image that illustrates the shape of the actual pointer is prestored in the memory device 20. For example, FIG. 7C illustrates the shape of the pointer In that is recognized. The score calculator 15d performs pattern matching between the recognized pointer In and the image stored in the memory device 20. The score calculator 15d calculates the score to be higher as the matching rate increases.

Figure 7D:
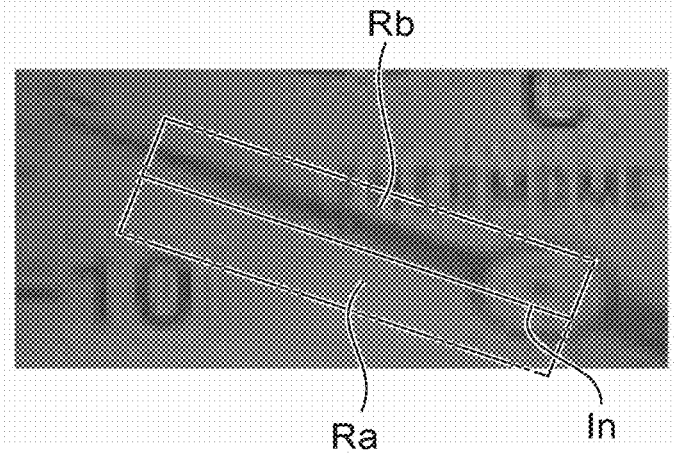

Or, the score calculator 15d may set two regions Ra and Rb as illustrated in FIG. 7D with the recognized pointer In as the center. The regions Ra and Rb are arranged in a direction perpendicular to the direction in which the pointer In extends. The score calculator 15d compares the luminance in the region Ra and the luminance in the region Rb. The difference between the luminance in the region Ra and the luminance in the region Rb is small when the angle of the recognized pointer In matches the angle of the actual meter shown in the image. The score calculator 15d calculates the score to be higher as the difference decreases.

The score calculator 15d may calculate the score by combining the two methods for calculating based on the pointer described above.

The score calculator 15d calculates the first score and the second score by the methods described above. The score calculator 15d may calculate the score by using two or more of the graduation group, the numeral group, and the pointer. For example, the score calculator 15d may calculate the score by combining two or more of the calculation methods based on the graduation group, the calculation method based on the numeral group, and the calculation method based on the pointer. The reliability of the score can be increased thereby.

The indication selector 15e selects one of the first indication or the second indication based on the first score and the second score. For example, the score is calculated to be high when the graduation group, the numeral group, or the pointer is recognized with high accuracy. In such a case, the indication selector 15e selects the higher of the first score and the second score. The indication selector 15e selects, as the indication of the meter, the indication corresponding to the selected score.

Or, a condition that relates to the first score and the second score may be prestored in the memory device 20. The indication selector 15e compares the first score or the second score to the condition. For example, the condition includes a threshold. The threshold may be preset by a user or may be set based on the calculation result of a previous score. When the score is calculated to be high when the recognition accuracy is high, the indication selector 15e compares the higher of the first score and the second score to the threshold. When the higher score is not more than the threshold, the processing by the corrector 13 may be re-performed.

The corrector 13 re-performs projective transformations of the first region and the second region by using a different condition from the projective transformations of the previous time. Subsequently, the first indication, the second indication, the first score, and the second score are calculated based on the first region of the re-performed projective transformation and the second region of the re-performed projective transformation. Thereby, the indication of the meter can be read with higher accuracy.

For example, the processing of the corrector 13 is repeated until the first score or the second score satisfies a condition. Or, the processing of the corrector 13 may be repeated a specified number of times, and the indication that has the highest score may be selected as the indication of the meter.

Or, instead of the processing of the corrector 13, the extraction of the contour by the contour extractor 12a, the selection of the contour by the contour selector 12b, the polar transformation by the second extractor 14, etc., may be re-performed using a different condition from the previous condition. Or, in addition to at least one of such processing, the processing of the corrector 13 may be re-performed using a different condition from the previous condition.

The reader 15 transmits the indication of the meter to the outputter 16. For example, the outputter 16 outputs information based on the indication to an external output device. For example, the information includes the indication that is read. The information may include the result calculated based on the indication that is read. The outputter 16 may calculate another value based on the multiple indications that are read and may output the calculation result. The information also may include the time of the reading, etc. Or, the outputter 16 may output a file including the information such as the indication that is read, the time of the reading, etc., in a prescribed format such as CSV, etc. The outputter 16 may transmit the data to an external server by using FTP (File Transfer Protocol), etc. Or, the outputter 16 may insert the data into an external database server by performing database communication and using ODBC (Open Database Connectivity), etc.

The processing device 10 includes, for example, a processing circuit made of a central processing unit. The functions of the acceptor 11, the first extractor 12, the corrector 13, the second extractor 14, the reader 15, and the outputter 16 are realized by the processing device 10. These functions may be realized by multiple processing devices. The memory device 20 includes, for example, at least one of a hard disk drive (HDD), a network-attached hard disk (NAS), an embedded multimedia card (eMMC), a solid-state drive (SSD), or a solid-state hybrid drive (SSHD). The processing device 10 and the memory device 20 are connected by a wired or wireless method. Or, the processing device 10 and the memory device 20 may be connected to each other via a network.

Figure 8:
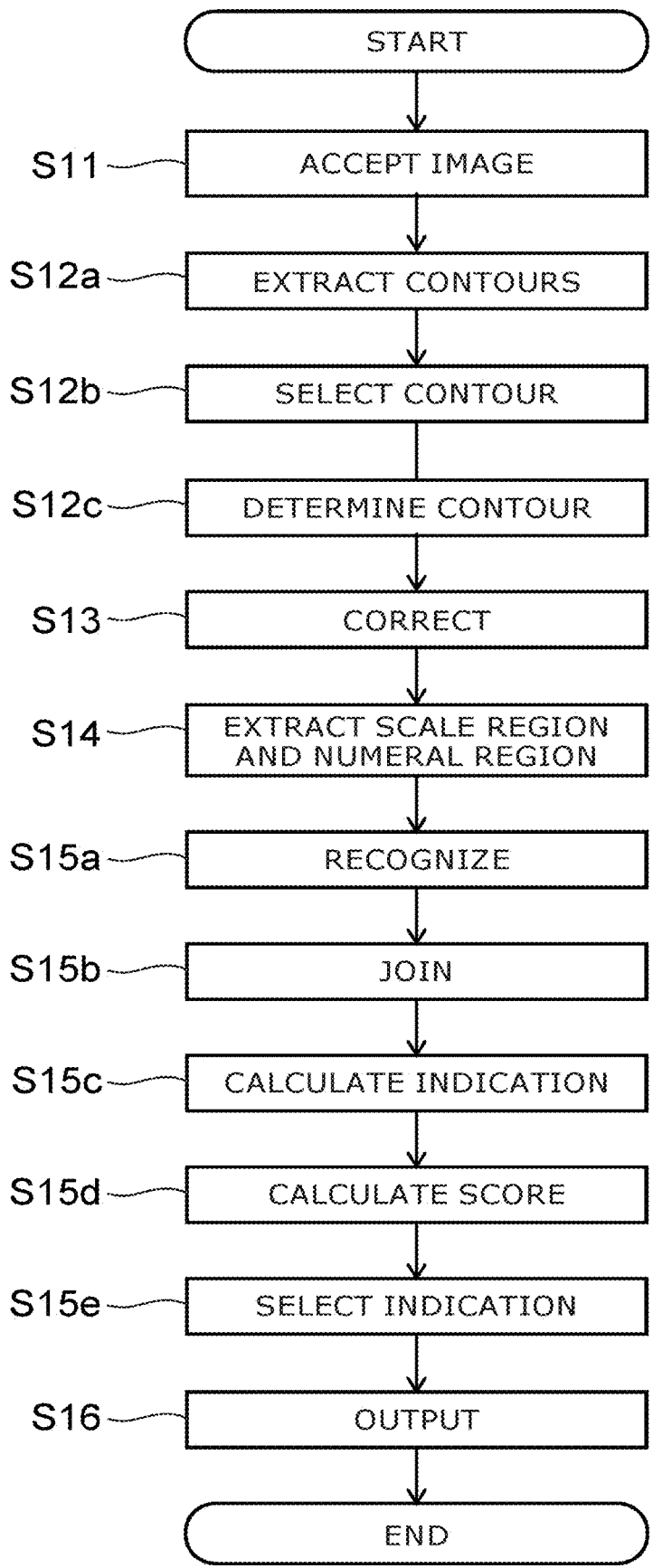
FIG. 8 is a flowchart illustrating the processing according to the reading system according to the first embodiment.

FIG. 8 is a flowchart illustrating the processing according to the reading system according to the first embodiment.

As illustrated in FIG. 8, the acceptor 11 accepts the input image (step S11). The contour extractor 12a extracts contours from the input image (step S12a). From the multiple contours that are extracted, the contour selector 12b selects a portion of the contours satisfying a condition (step S12b). The determiner 12c determines the first contour and the second contour from the selected contour (step S12c). The corrector 13 performs projective transformations and corrections for the first region surrounded with the first contour and the second region surrounded with the second contour (step S13). The second extractor 14 extracts the first scale region and the first numeral region from the first region and extracts the second scale region and the second numeral region from the second region (step S14).

The recognizer 15a recognizes the first graduation group, the first numeral group, and the first pointer from the first scale region and the first numeral region. The recognizer 15a recognizes the second graduation group, the second numeral group, and the second pointer from the second scale region and the second numeral region (step S15a). The graduation joiner 15b causes the multiple graduations included in the first graduation group and the multiple numerals included in the first numeral group to correspond to each other. The graduation joiner 15b causes the multiple graduations included in the second graduation group and the multiple numerals included in the second numeral group to correspond to each other (step S15b). The indication calculator 15c calculates the first indication based on the first region and the second indication based on the second region (step S15c). The score calculator 15d calculates the first score by using the first graduation group, the first numeral group, or the first pointer. The score calculator 15d calculates the second score by using the second graduation group, the second numeral group, or the second pointer (step S15d). The indication selector 15e selects one of the first indication or the second indication based on the first score and the second score (step S15e). The outputter 16 outputs the selected one of the first indication or the second indication (step S16).

Effects of the first embodiment will now be described.

When reading the indication of the meter, a method may be considered in which the scale region and the numeral region are extracted based on a designated contour included in the meter. If the designated contour can be detected with high accuracy, the indication of the meter is read with high accuracy by using this method. However, there is a possibility that the designated contour cannot be extracted correctly if other components may be mounted to the meter or if the resolution of the image is low. Also, there is a possibility that the designated contour cannot be extracted correctly if light is reflected by the meter or dirt or the like is adhered to the meter. For example, in the example illustrated in FIG. 3A and FIG. 3B, a cable is connected to the meter, and the outer contour of the meter is not extracted correctly due to the effects of the cable.

For this problem, multiple contours that are included in one meter are extracted in the reading system 1 according to the first embodiment. Then, an indication and a score are calculated based on each of the multiple contours that are extracted. For example, the reading accuracy of the indication of the meter can be increased by selecting one of the indications based on the calculated scores. The reliability of the reading system 1 can be increased thereby.

Or, the outputter 16 may output the selected one of the first indication or the second indication and one of the first score or the second score relating to the one of the first indication or the second indication. Thereby, the user can ascertain the sureness of the selected indication. For example, even when an abnormal indication that is different from the normal indication is output, the user can confirm the sureness of the indication by referring to the score.

The outputter 16 may output at least one of the first indication or the second indication and at least one of the first region or the second region. For example, the outputter 16 outputs the selected one of the first indication or the second indication and one of the first region or the second region where the one of the first indication or the second indication is obtained. Because the image that is the basis of the selected indication is output, the user easily can ascertain whether or not the indication is correct.

In the example described above, one of the first indication or the second indication is selected by the indication selector 15e. The reading system 1 is not limited to the example; the reading system 1 according to the first embodiment may output the first indication, the second indication, the first score, and the second score. For example, the user determines which of the first indication or the second indication to employ by referring to the first score and the second score. Because the first score and the second score are output, the user can ascertain the sureness of each indication. Or, the user also can confirm whether or not the image used in the reading is appropriate by referring to the first score and the second score. For example, when both the first score and the second score are low, the user may modify the location of the meter, the configuration, the imaging condition of the imaging device, etc., to obtain a more appropriate image.

According to the reading system 1 according to the first embodiment, even when only one contour is selected by the contour selector 12b, the contour of the meter that corresponds to the contour can be determined. Therefore, the scale region and the numeral region can be set more appropriately for the region surrounded with the selected contour. As a result, the indication of the meter can be read with higher accuracy.

In the example described above, the reading system 1 calculates two indications (the first and second indications). The reading system 1 is not limited to the example; the reading system 1 may calculate three or more indications based on three or more contours of the meter. In such a case, the reading system 1 calculates three or more scores that relate respectively to the three or more indications.

EXAMPLES

An example of a method for calculating the score will now be described.

The score calculator 15d performs pattern matching of the scale region recognized by the recognizer 15a and the prestored image of the scale region. For example, the recognized scale region and the image of the scale region are illustrated as binary images. In the binary images, the graduations are illustrated using white, and the background is illustrated using black. The score calculator 15d uses the proportion of the number of white pixels included in the recognized scale region to the number of white pixels included in the image of the scale region as a matching rate. The score calculator 15d uses the matching rate as the score based on the graduation group.

The score calculator 15d averages match rates of the recognition of the numerals by the recognizer 15a and uses the average value as the score based on the numeral group.

The score calculator 15d performs pattern matching of the pointer recognized by the recognizer 15a and the prestored image of the pointer. The score calculator 15d uses the matching rate as the score based on the pointer.

The score calculator 15d performs the following calculation.

$$S = S_1 \times W_1 + S_2 \times W_2 + S_3 \times W_3$$

$S_1$ is the score calculated based on the graduation group. $W_1$ is the weight for the score $S_1$. $S_2$ is the score calculated based on the numeral group. $W_2$ is the weight for the score $S_2$. $S_3$ is the score calculated based on the pointer. $W_3$ is the weight for the score $S_3$.

The score calculator 15d calculates the score S described above based on each of the first region and the second region and uses the scores S as the first score and the second score. As an example, the weight $W_1$ is set to 0.7. The weight $W_2$ is set to 0.5. The weight $W_3$ is set to 0.2. The first score that is based on the first region surrounded with the first contour e1 illustrated in FIG. 5A is 0.83. The second score that is based on the second region surrounded with the second contour e2 illustrated in FIG. 5B is 0.58. As a result, for example, the indication selector 15e selects the first indication corresponding to the first score which is higher.

Second Embodiment

Figure 9:
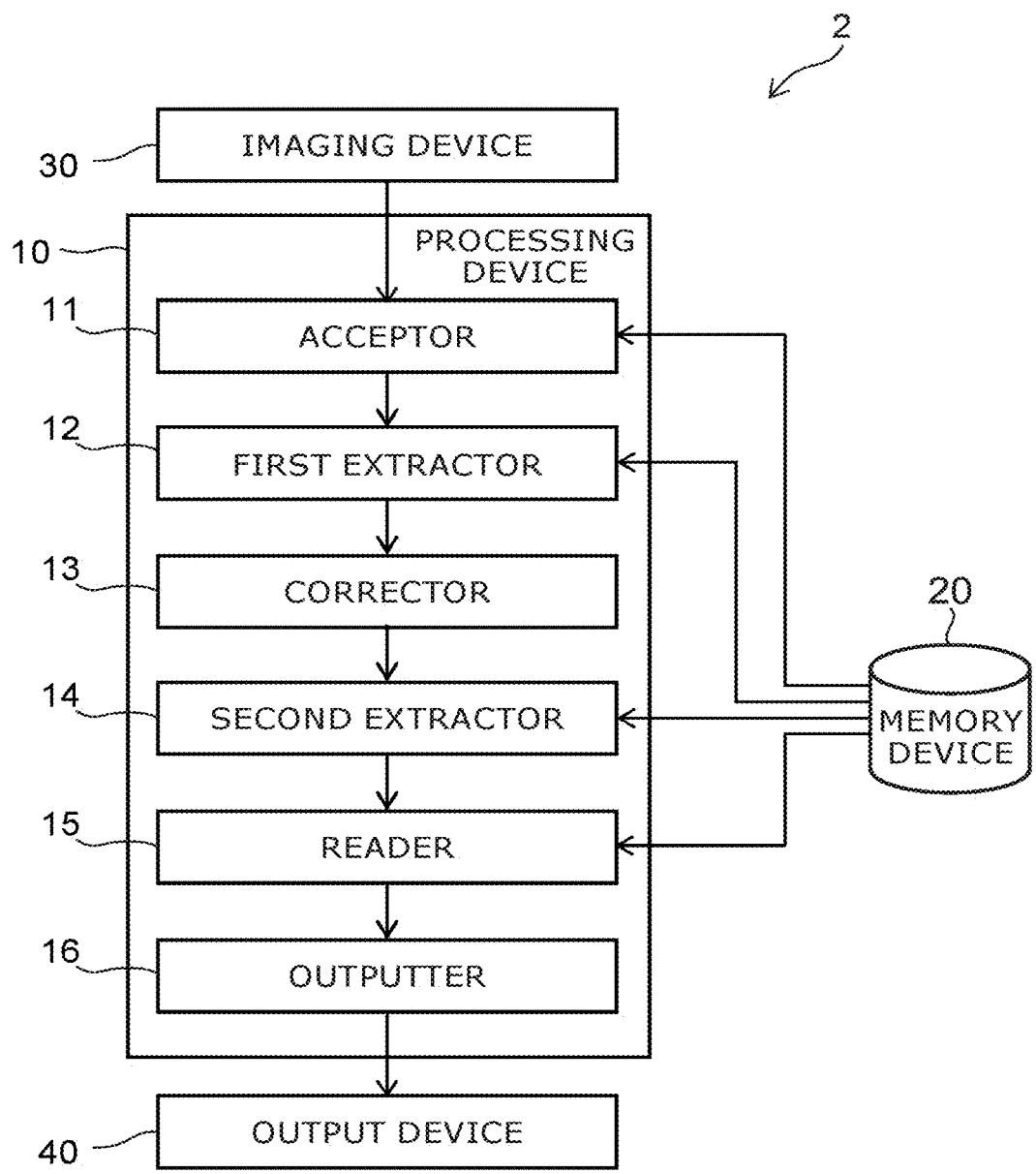
FIG. 9 is a block diagram illustrating a configuration of a reading system according to a second embodiment.

FIG. 9 is a block diagram illustrating a configuration of a reading system according to a second embodiment.

The reading system 2 according to the second embodiment further includes an imaging device 30. The imaging device 30 generates an image by imaging a meter. The imaging device 30 transmits the generated image to the processing device 10. Or, the imaging device 30 may store the image in the memory device 20. The processing device 10 refers to the stored image by accessing the memory device 20. When the imaging device 30 acquires a video image, the imaging device 30 extracts a static image from the video image and transmits the static image to the processing device 10. The imaging device 30 includes, for example, a camera.

The processing device 10 transmits, to an output device 40, information based on numerals read from the image that is imaged. The output device 40 outputs the information received from the processing device 10 so that the user can recognize the information. The output device 40 includes, for example, at least one of a monitor, a printer, a projector, or a speaker.

For example, the processing device 10, the memory device 20, the imaging device 30, and the output device 40 are connected to each other by a wired or wireless method. Or, these components may be connected to each other via a network. Or, at least two or more of the processing device 10, the memory device 20, the imaging device 30, or the output device 40 may be embedded in one device. For example, the processing device 10 may be embedded integrally with the image processor of the imaging device 30, etc.

Third Embodiment

Figure 10:
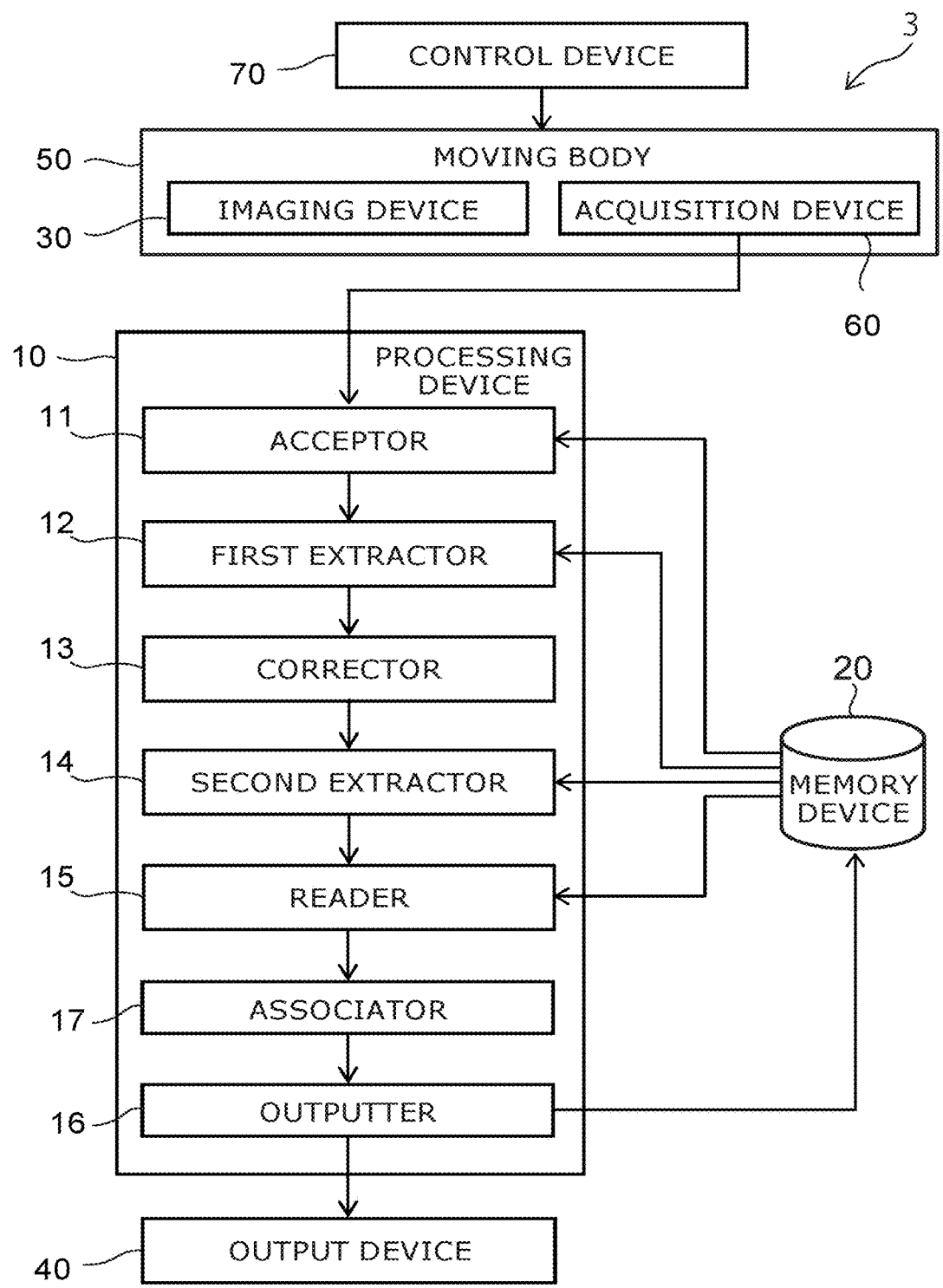
FIG. 10 is a block diagram illustrating a configuration of another reading system according to a third embodiment.

FIG. 10 is a block diagram illustrating a configuration of another reading system according to a third embodiment.

The reading system 3 according to the third embodiment further includes a moving body 50. The moving body 50 moves through a prescribed area. A meter is provided in the area through which the moving body 50 moves. The moving body 50 is, for example, an automatic guided vehicle (AGV). The moving body 50 may be a flying object such as a drone, etc. The moving body 50 may be an independent walking robot. The moving body 50 may be an unmanned forklift, crane, or the like that performs a prescribed operation.

For example, the processing device 10 and the imaging device 30 are mounted to the moving body 50. The processing device 10 may be provided separately from the moving body 50 and may be connected to the moving body 50 via a network. When the moving body 50 moves to a position where the meter is imageable, the imaging device 30 generates an image by imaging the meter.

In the processing of the processing device 10, the meter may be reimaged by the imaging device 30 when the first score or the second score is determined not to satisfy a preset condition. The imaging device 30 reimages the meter using a different condition from the imaging of the previous time. For example, the imaging device 30 reimages the meter by modifying the exposure time, the aperture stop value, or the ISO sensitivity. The position of the moving body 50 may be included in the condition of the imaging. In other words, the imaging device 30 may operate the moving body 50 and image the meter at a different position from the imaging of the previous time.

As illustrated in FIG. 10, the reading system 3 may further include an acquisition device 60. The acquisition device 60 is mounted to the moving body 50. For example, an identifier that includes unique identification information corresponding to the meter is provided. The acquisition device 60 acquires the identification information of the identifier.

As illustrated in FIG. 10, the reading system 3 may further include a control device 70. The control device 70 controls the moving body 50. The moving body 50 moves through the prescribed area based on a command transmitted from the control device 70. The control device 70 may be mounted to the moving body 50 or may be provided separately from the moving body 50. The control device 70 includes, for example, a processing circuit made of a central processing unit. One processing circuit may function as both the processing device 10 and the control device 70.

For example, the identifier is a radio frequency (RF) tag including ID information. The identifier emits an electromagnetic field or a radio wave including the ID information. The acquisition device 60 acquires the ID information by receiving the electromagnetic field or the radio wave emitted from the identifier.

Or, the identifier may be a one-dimensional or two-dimensional barcode. The acquisition device 60 may be a barcode reader. The acquisition device 60 acquires the identification information of the barcode by reading the barcode.

As illustrated in FIG. 10, the processing device 10 may further include an associator 17. For example, when acquiring the identification information, the acquisition device 60 transmits the identification information to the processing device 10. The associator 17 associates the transmitted identification information and the characters that are read. The associated information is stored in the memory device 20.

Figure 11:
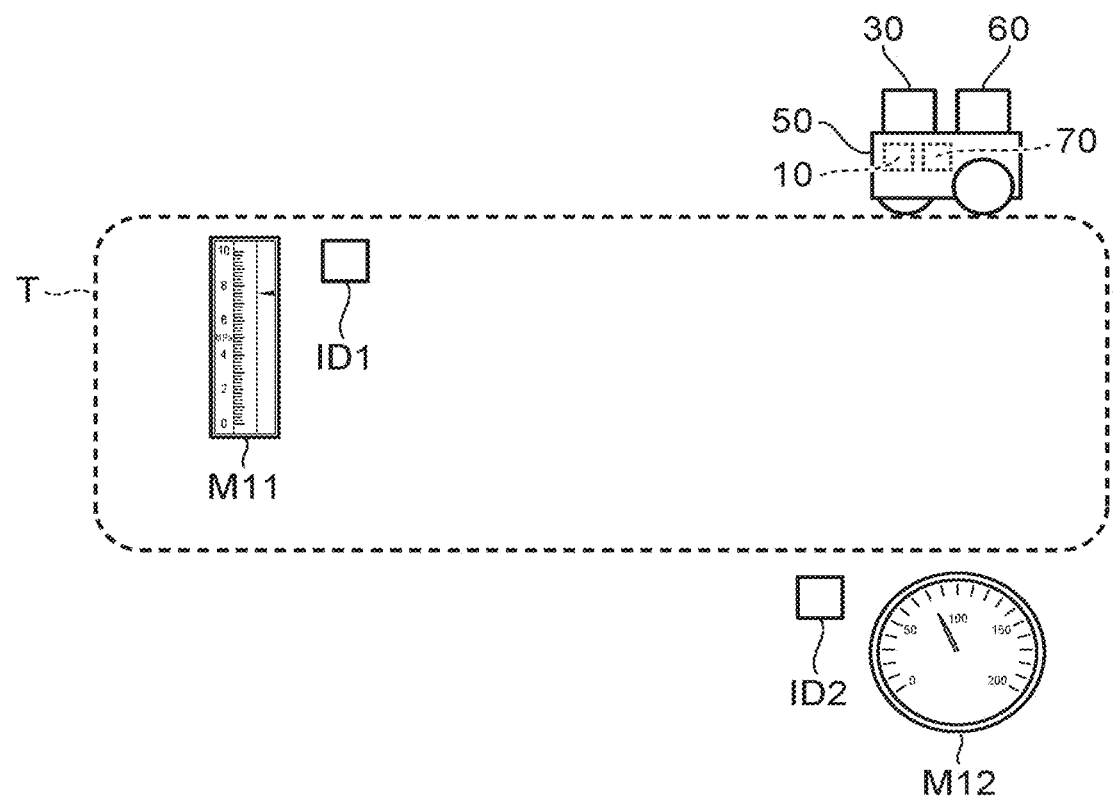
FIG. 11 is a schematic view describing an operation of the reading system according to the third embodiment.

FIG. 11 is a schematic view describing an operation of the reading system according to the third embodiment.

For example, the moving body 50 is a moving body moving along a prescribed trajectory T. The imaging device 30 and the acquisition device 60 are mounted to the moving body 50. The processing device 10 may be mounted to the moving body 50 or may be provided separately from the moving body 50. The trajectory T is provided so that the moving body 50 passes in front of meters M11 and M12.

For example, the moving body 50 moves along the trajectory T and decelerates or stops when arriving at a position where the meter M11 or M12 is imageable by the imaging device 30. For example, when decelerating or stopping, the moving body 50 transmits an imaging command to the imaging device 30. Or, the imaging command may be transmitted to the imaging device 30 from the control device 70. When receiving the command, the imaging device 30 images the meter M11 or M12 while the moving body 50 has decelerated or stopped.

Or, the moving body 50 moves along the trajectory T at a speed such that the imaging device 30 can image the meter M11 or M12 without blur. When the position where the meter M11 or M12 is imageable by the imaging device 30 is reached, the imaging command is transmitted from the moving body 50 or the control device recited above. When receiving the command, the imaging device 30 images the meter M11 or M12. When the image has been generated by imaging, the imaging device 30 transmits the image to the processing device 10 mounted to the moving body 50 or provided separately from the moving body 50.

An identifier ID1 is provided at the meter M11 vicinity. An identifier ID2 is provided at the meter M12 vicinity. For example, the acquisition device 60 acquires the identification information of the identifier ID1 or ID2 while the moving body 50 has decelerated or stopped.

For example, the moving body 50 moves in front of the meter M11. The imaging device 30 generates an image by imaging the meter M11. The reading system 1 reads the indication of the meter M11 from the image. Also, the acquisition device 60 acquires the identification information of the identifier ID1 corresponding to the meter M11. The reading system 1 associates the identification information and the indication of the meter.

According to the embodiments described above, the reliability of the indication read from the meter can be increased by using the reading system, the moving body, and the reading method. Similarly, the reliability of the indication read from the meter can be increased by using a program for causing a computer (a processing device) to operate as the acceptor 11, the first extractor 12, the corrector 13, the second extractor 14, the reader 15, the outputter 16, etc.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

The processing device and the control device according to the embodiments include one or multiple devices (e.g., personal computers, etc.). The processing device and the control device according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A reading system, comprising:
a first extractor extracting a first region and a second region from an image, a meter being imaged in the image, the first region being surrounded with a first contour, the second region being surrounded with a second contour positioned outward of the first contour;
a reader calculating a first indication based on the first region, calculating a second indication based on the second region, calculating a first score based on the first region, and calculating a second score based on the second region, the first score relating to the first indication, the second score relating to the second indication; and
a corrector performing at least projective transformations of the first region and the second region, wherein
the first extractor:
   detects a plurality of contours from the image,
   determines a relationship between a luminance of a region positioned inward of the plurality of contours and a luminance of a region positioned outward of the plurality of contours for each of the plurality of contours,
   determines one of the plurality of contours to be the first contour when the relationship of the one of the plurality of contours is a first relationship, and
   determines an other one of the plurality of contours to be the second contour when the relationship of the other one of the plurality of contours is a second relationship, the first relationship and the second relationship being preset;
when the first score or the second score does not satisfy a preset condition, the corrector re-performs projective transformations of the first region and the second region by using a different condition from a projective transformation of a previous time, and the reader calculates the first indication, the second indication, the first score, and the second score based on the first region of the re-performed projective transformation and the second region of the re-performed projective transformation.

2. The system according to claim 1, wherein
based on the first score and the second score, the reader selects one of the first indication or the second indication as an indication of the meter.

3. The system according to claim 2, further comprising:
an outputter outputting the one of the first indication or the second indication, and outputting one of the first score or the second score relating to the one of the first indication or the second indication.

4. The system according to claim 3, wherein
the outputter also outputs the image, the first region, or the second region.

5. The system according to claim 1, further comprising:
a second extractor,
the second extractor extracting a first scale region and a first numeral region from the first region, and extracting a second scale region and a second numeral region from the second region,
the reader calculating the first indication based on a first graduation group, a first numeral group, and a first pointer recognized from the first scale region and the first numeral region, and calculating the second indication based on a second graduation group, a second numeral group, and a second pointer recognized from the second scale region and the second numeral region.

6. The system according to claim 5, wherein
the reader calculates the first score based on at least one of the first graduation group, the first numeral group, or the first pointer and calculates the second score based on at least one of the second graduation group, the second numeral group, or the second pointer.

7. A reading system comprising:
a first extractor extracting a first region and a second region from an image, a meter being imaged in the image, the first region being surrounded with a first contour, the second region being surrounded with a second contour positioned outward of the first contour;
a reader calculating a first indication based on the first region, calculating a second indication based on the second region, calculating a first score based on the first region, and calculating a second score based on the second region, the first score relating to the first indication, the second score relating to the second indication; and an imaging device acquiring the image by imaging the meter, wherein when the first score or the second score does not satisfy a preset condition, the imaging device reacquires the image of the meter by imaging the meter by using a different condition from an imaging of a previous time, the reader calculates the first indication, the second indication, the first score, and the second score by using the reacquired image;

further comprising a corrector performing at least projective transformations of the first region and the second region, wherein the first extractor:
  detects a plurality of contours from the image,
  determines a relationship between a luminance of a region positioned inward of the plurality of contours and a luminance of a region positioned outward of the plurality of contours for each of the plurality of contours,
  determines one of the plurality of contours to be the first contour when the relationship of the one of the plurality of contours is a first relationship, and
  determines an other one of the plurality of contours to be the second contour when the relationship of the other one of the plurality of contours is a second relationship, the first relationship and the second relationship being preset;

when the first score or the second score does not satisfy a preset condition, the corrector re-performs projective transformations of the first region and the second region by using a different condition from a projective transformation of a previous time, and the reader calculates the first indication, the second indication, the first score, and the second score based on the first region of the re-performed projective transformation and the second region of the re-performed projective transformation.

8. The system according to claim 7, further comprising: a moving body to which the imaging device is mounted.

9. The system according to claim 7, wherein the imaging device images a video image in which the meter is imaged, and cuts out the image from the video image.

10. A moving body, comprising:
an imaging device acquiring an image by imaging a meter;
a first extractor extracting a first region and a second region from the image, the first region being surrounded with a first contour, the second region being surrounded with a second contour positioned outward of the first contour; and
a reader calculating a first indication based on the first region, calculating a second indication based on the second region, calculating a first score based on the first region, and calculating a second score based on the second region, the first score relating to the first indication, the second score relating to the second indication; and
a corrector performing at least projective transformations of the first region and the second region, wherein
the first extractor:
  detects a plurality of contours from the image,
  determines a relationship between a luminance of a region positioned inward of the plurality of contours and a luminance of a region positioned outward of the plurality of contours for each of the plurality of contours,
  determines one of the plurality of contours to be the first contour when the relationship of the one of the plurality of contours is a first relationship, and
  determines an other one of the plurality of contours to be the second contour when the relationship of the other one of the plurality of contours is a second relationship, the first relationship and the second relationship being preset;

when the first score or the second score does not satisfy a preset condition, the corrector re-performing projective transformations of the first region and the second region by using a different condition from a projective transformation of a previous time, and the reader calculating the first indication, the second indication, the first score, and the second score based on the first region of the re-performed projective transformation and the second region of the re-performed projective transformation.

11. The moving body according to claim 10, wherein the imaging device images a video image in which the meter is imaged, and cuts out the image from the video image.

12. A moving body, comprising:
an imaging device acquiring an image by imaging a meter;
a first extractor extracting a first region and a second region from the image, the first region being surrounded with a first contour, the second region being surrounded with a second contour positioned outward of the first contour; and
a reader calculating a first indication based on the first region, calculating a second indication based on the second region, calculating a first score based on the first region, and calculating a second score based on the second region, the first score relating to the first indication, the second score relating to the second indication, wherein when the first score or the second score does not satisfy a preset condition, the imaging device reacquires the image of the meter by imaging the meter by using a different condition from an imaging of a previous time, the reader calculates the first indication, the second indication, the first score, and the second score by using the reacquired image, a corrector performing at least projective transformations of the first region and the second region, wherein
the first extractor:
  detects a plurality of contours from the image,
  determines a relationship between a luminance of a region positioned inward of the plurality of contours and a luminance of a region positioned outward of the plurality of contours for each of the plurality of contours,
  determines one of the plurality of contours to be the first contour when the relationship of the one of the plurality of contours is a first relationship, and
  determines an other one of the plurality of contours to be the second contour when the relationship of the other one of the plurality of contours is a second relationship, the first relationship and the second relationship being preset;

when the first score or the second score does not satisfy a preset condition, the corrector re-performs projective transformations of the first region and the second region by using a different condition from a projective transformation of a previous time, and the reader calculates the first indication, the second indication, the first score, and the second score based on the first region of the re-performed projective transformation and the second region of the re-performed projective transformation.

13. A reading method, comprising:

extracting a first region and a second region from an image in which a meter is imaged, the first region being surrounded with a first contour, the second region being surrounded with a second contour positioned outward of the first contour; and calculating a first indication based on the first region, calculating a second indication based on the second region, calculating a first score based on the first region, and calculating a second score based on the second region, the first score relating to the first indication, the second score relating to the second indication; and performing at least projective transformations of the first region and the second region, wherein the extracting includes:
 detecting a plurality of contours from the image,
 determining a relationship between a luminance of a region positioned inward of the plurality of contours and a luminance of a region positioned outward of the plurality of contours for each of the plurality of contours,
 determining one of the plurality of contours to be the first contour when the relationship of the one of the plurality of contours is a first relationship, and
 determining an other one of the plurality of contours to be the second contour when the relationship of the other one of the plurality of contours is a second relationship, the first relationship and the second relationship being preset;

when the first score or the second score does not satisfy a preset condition, projective transformations of the first region and the second region are re-performed by using a different condition from a projective transformation of a previous time, and the first indication, the second indication, the first score, and the second score are calculated based on the first region of the re-performed projective transformation and the second region of the re-performed projective transformation.

14. The method according to claim 13, further comprising:
based on the first score and the second score, selecting one of the first indication or the second indication as an indication of the meter.

15. The method according to claim 14, further comprising:
extracting a first scale region and a first numeral region from the first region; and
extracting a second scale region and a second numeral region from the second region,
the first indication being calculated based on a first graduation group, a first numeral group, and a first pointer recognized from the first scale region and the first numeral region,
the second indication being calculated based on a second graduation group, a second numeral group, and a second pointer recognized from the second scale region and the second numeral region.

16. The method according to claim 15, wherein
the first score is calculated based on at least one of the first graduation group, the first numeral group, or the first pointer, and
the second score is calculated based on at least one of the second graduation group, the second numeral group, or the second pointer.

17. The method according to claim 13, further comprising:
imaging a video image in which the meter is imaged, and cutting out the image from the video image.

18. A non-transitory computer-readable storage medium storing a program causing a processing device to execute the method according to claim 13.

19. A reading method, comprising:
acquiring an image by imaging a meter;
extracting a first region and a second region from the image, the first region being surrounded with a first contour, the second region being surrounded with a second contour positioned outward of the first contour; and
calculating a first indication based on the first region, calculating a second indication based on the second region, calculating a first score based on the first region, and calculating a second score based on the second region, the first score relating to the first indication, the second score relating to the second indication, wherein
when the first score or the second score does not satisfy a preset condition, the image of the meter is reacquired by imaging the meter by using a different condition from an imaging of a previous time,
the first indication, the second indication, the first score, and the second score are calculated by using the reacquired image,
further comprising a correcting performing at least projective transformations of the first region and the second region, wherein
the extracting:
 detects a plurality of contours from the image,
 determines a relationship between a luminance of a region positioned inward of the plurality of contours and a luminance of a region positioned outward of the plurality of contours for each of the plurality of contours,
 determines one of the plurality of contours to be the first contour when the relationship of the one of the plurality of contours is a first relationship, and
 determines an other one of the plurality of contours to be the second contour when the relationship of the other one of the plurality of contours is a second relationship, the first relationship and the second relationship being preset;

when the first score or the second score does not satisfy a preset condition, the correcting re-performs projective transformations of the first region and the second region by using a different condition from a projective transformation of a previous time, and the calculating calculates the first indication, the second indication, the first score, and the second score based on the first region of the re-performed projective transformation and the second region of the re-performed projective transformation.

20. A non-transitory computer-readable storage medium storing a program causing a processing device to execute the method according to claim 19.

* * * * *